No. 819,516. PATENTED MAY 1, 1906.
P. W. & E. G. CHAMBERLAIN.
TOOL FOR CUTTING AND FITTING BOILER TUBES.
APPLICATION FILED JULY 6, 1905.
2 SHEETS—SHEET 1.
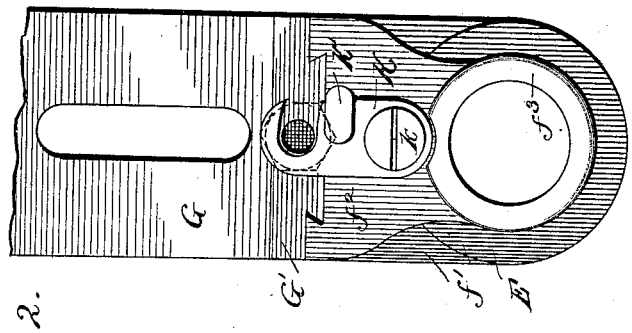
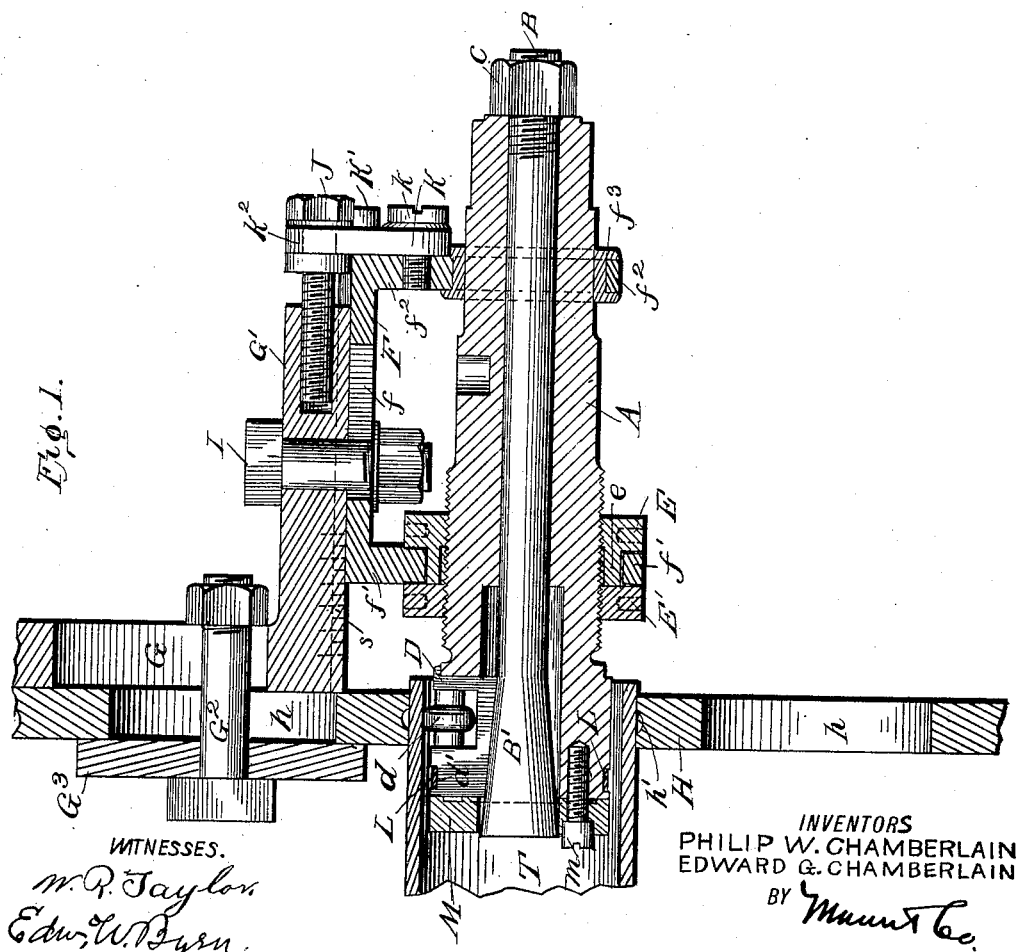
INVENTORS
PHILIP W. CHAMBERLAIN.
EDWARD G. CHAMBERLAIN.
ATTORNEYS No. 819,516. PATENTED MAY 1, 1906.
P. W. & E. G. CHAMBERLAIN.
TOOL FOR CUTTING AND FITTING BOILER TUBES.
APPLICATION FILED JULY 6, 1905.
2 SHEETS—SHEET 2.
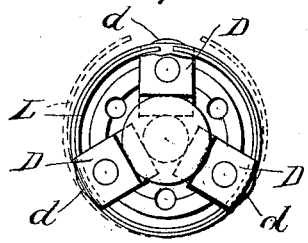
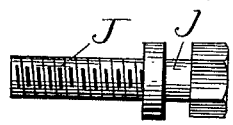
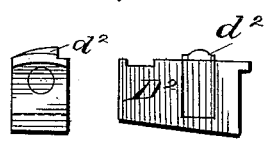
 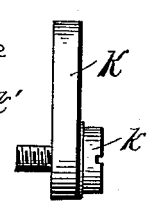
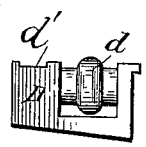
WITNESSES:
W. R. Taylor
Edw. W. Byrn.
INVENTORS
PHILIP W. CHAMBERLAIN.
EDWARD G. CHAMBERLAIN.
BY Munn & Co
ATTORNEYS

UNITED STATES PATENT OFFICE.

PHILIP W. CHAMBERLAIN AND EDWARD G. CHAMBERLAIN, OF GREYTOWN, NICARAGUA.

TOOL FOR CUTTING AND FITTING BOILER-TUBES.

No. 819,516.             Specification of Letters Patent.             Patented May 1, 1906.

Application filed July 6, 1905. Serial No. 268,586.

*To all whom it may concern:*

Be it known that we, PHILIP W. CHAMBERLAIN and EDWARD G. CHAMBERLAIN, citizens of the United States, residing at Greytown, Nicaragua, have invented a new and useful Improvement in Tools for Cutting and Fitting Boiler-Tubes, of which the following is a specification.

Our invention relates to that class of tools which are used for expanding the ends of boiler-tubes into the heads of boilers, so as to tightly and firmly seat them therein. Such tools usually comprehend a central tapering mandrel and a set of expanding-wheels arranged in movable bearings around the mandrel, so that when the mandrel and its expanding-wheels are inserted in the end of a tube and the mandrel is adjusted longitudinally the wheels will be projected outwardly against the inner surface of the tube and when the mandrel and wheels are rotated together the wheels will swage and expand the end of the tube into the seat in the boiler-head. With such tools the necessary relation of the tool to the work so obscures the point of contact of the wheels against the tube as to make it impossible to ascertain whether the wheels are acting in the exact plane to do accurate and effective work.

Our invention consists in means whereby the tool may be so gaged or adjusted and be taken out from time to time and reinserted, so as to accurately come again into the same plane of action or any modification of the position necessary to correct errors or enable it to work in any desired plane.

It is especially applicable to swaging the tube into a middle groove or annular recess milled out of the edge of the hole in the boiler-head and lying in the plane of the boiler-head and in a middle position in the thickness of the plate forming the boiler-head, which operation requires very accurate adjustment of the tool and close inspection of the work.

Our invention also consists in such construction of the expander-head as to enable it to be used not only for expanding the tube into place, but also for cutting and removing old tubes and for milling the annular groove in the boiler-head plate, as will be hereinafter more fully described with reference to the drawings, in which—

Figure 1 is a sectional side view of the tool as applied in the act of expanding a tube in an annular groove in the thickness of the plate forming the boiler-head. Fig. 2 is an outer end view of the supporting-frame and adjusting devices for the rotary mandrel. Fig. 3 is an end view of the rotary mandrel-head with the outer cap removed. Fig. 4 shows details of a gage-latch and locking-pin, and Fig. 5 shows details of various dies used in the mandrel for swaging, cutting, and milling.

Referring to Fig. 1, H is the head-plate of a boiler containing the circular holes $h$, in which tubes are to be seated. T represents one of the boiler-tubes which is to be expanded into an annular groove $h'$ lying midway in the plane of the plate forming the boiler-head, which groove has been previously milled into the edge of the hole by our tool, as hereinafter described. A is the mandrel-sleeve, and B B' is the longitudinally-adjustable mandrel located centrally in the sleeve and having at its inner end a tapering portion B' largest at the inner end and having at its outer end a screw-threaded portion B adapted to receive a nut C, which when turned up against the end of the sleeve draws outwardly the mandrel with its tapering inner end. The inner end of the mandrel-sleeve forms the mandrel-head and is milled out with three (more or less) recesses to receive three bearing-blocks D, (see Fig. 3,) carrying swaging-wheels $d$. Each of these bearing-blocks is formed on its outer surface with a recess $d'$, in which lies a circular flat spring L, and which spring by embracing all of the blocks presses them in toward the mandrel and serves to withdraw the wheels from the groove which they form in the tube after being swaged, so that the tool can be taken out of the tube. Outside of these blocks there is an annular cap-plate M, secured by lag-screws $m$, seated in the mandrel-head. When the mandrel is drawn outwardly, it will be seen that the swaging-wheels are projected outwardly, and when the mandrel is forced in the ring-shaped spring L draws the wheel-blocks with their wheels inwardly. To rotate the mandrel to swage the tube into the boiler-head, the mandrel-sleeve is made the full length of the tool and at its outer end is made square or polygonal to receive a wrench, and the mandrel-sleeve is also bored with several radial holes on the side to receive the end of a rod, either or both of which means may be employed, according to the space available to work in and the convenience of the workman.

We will now describe the means whereby the plane of action of the expanding-wheels $d$ is accurately regulated and the tool removed and replaced in the same situation or any modification thereof with absolute and predetermined accuracy in spite of the obscuring effect of the tool.

G is a right-angular bracket which forms a supporting-frame for and a part of the tool. This bracket is temporarily supported upon the boiler-head by means of a bolt $G^2$ and a cross-bar $G^3$ the bolt being extended through one of the flue-holes $h$ in the boiler-head and the cross-bar $G^3$ being made longer than the diameter of the flue-hole and bridging across the same on the inside and forming an anchorage for the head of bolt $G^2$, which tightly clamps and holds the bracket G by means of the nut on the outer end of the bolt. Below the horizontal member $G'$ of the bracket there is arranged a longitudinally-adjustable swivel-frame F. This has a dovetail or undercut connection with the horizontal member $G'$ of the bracket, as seen in Fig. 2, and is adjusted horizontally by means of a slot $f$ and a bolt I, passing through said bracket-arm $G'$ and the slot $f$. The inner end of this swivel-frame has a depending ring $f'$, which forms a bearing for a sectional collar E E', adjustably, but rigidly, connected to the mandrel-sleeve. The outer end of the swivel-frame has also a second depending ring $f^2$, provided with a bushing $f^3$, of brass, which forms a bearing for the outer end of the mandrel-sleeve. The sectional collar consists of a ring E', screw-threaded on the inner periphery, and another ring E, correspondingly screw-threaded and having also an offsetting flange $e$. The mandrel-sleeve at this point is exteriorly screw-threaded and when the two sections E E' of the collar are screwed tightly together on the mandrel-sleeve they act like jam-nuts and become rigidly attached to the mandrel-sleeve and turn with it, the space outside the flange $e$ and between the main body of the ring E and E' forming a swiveling annular seat that receives the depending stationary ring $f'$ of the frame F. The two rings $f'$ $f^2$ form not only a swivel-support for the sleeve between its ends, but also hold the tool and its swaging-rollers in an exact and definite relation to the groove $h'$ in the boiler-head, as will now be described. On the outer head of the swivel-frame F is hinged or pivoted a gage-latch K. This gage-latch turns about a center-screw $k$ and has (see Fig. 4) a hook $k^2$ at its upper end and a semicircular notch $k'$ in its side. J is a bolt which is tapped in a screw-threaded hole extending horizontally into the end of the horizontal arm $G'$ of the supporting-bracket. This bolt (see Fig. 4) has an elongated head with a circular groove $j$ around it, which circular groove is designed to receive the hook $k^2$ of the latch K, as seen in Fig. 1. The function of these parts is as follows: When the swage-rollers $d$ have been adjusted to the exact plane of the groove $h'$ in the boiler-head and the sectional collar E E' is tightened up and made rigid with the mandrel-sleeve, the swivel-frame F is clamped immovably to the arm $G'$ by means of bolt I and the latch K has its hook $k^2$ locked in the groove $j$ of bolt J. Now if it is desired to take out the tool and inspect the progress or accuracy of the work the bolt I is taken out, the latch K thrown back, and the mandrel, sleeve, and swivel-frame F may be then slid out horizontally and detached, so that the work on the end of the tube can be inspected interiorly. Then when the tool is to be returned to its work the mandrel-sleeve and frame F are again slipped into position by means of the dovetail guides along the top edge of the frame F, and when the mandrel sleeve and frame F pass far enough in to allow the latch K to drop into the groove $j$ of the bolt J it is certain that the rollers $d$ are restored to their former plane of action, and if this plane of action is to be changed to correct any defect or inaccuracy this is easily effected by turning the bolt J in or out of arm $G'$, as the case may be, and then inserting and tightening up the clamp-bolt I. To lock the latch K and also to hold it more firmly against the swaging strain, a locking-screw $K'$, Figs. 2 and 4, (which lies in the semicircular seat $k'$ of the latch) is turned up until it tightly binds and holds the latch, thus strengthening its connections and avoiding all looseness and inaccuracy. To contribute to the accuracy of the tool, a series of graduations $s$ is placed on the edge of arm $G'$ of the bracket, with which the inner end of the frame F may register and which is to be observed before throwing out the latch K.

In making use of our invention it is applicable to and designed to be used for cutting out old boiler-tubes and for milling out the annular seats for new ones to be inserted. For this purpose the bearing-blocks D, carrying rollers $d$, are removed and other bearing-blocks with cutters or milling tools are substituted.

In Fig. 5 $D^3$ represents blocks with rotary cutters $d^3$ for cutting the tube from the inside, and $D^2$ represents a similar block with a milling-tool $d^2$. By means of the latter the grooves $h'$ are accurately cut in the middle line of the boiler-head plate. These rollers, cutters, and milling-bits we designate under the general term of "dies." To make the substitution, the spring-ring L of the mandrel-head is bisected on one side, so that it may be spread apart at its ends to form a gate through which the blocks bearing the dies may be removed or inserted. When this is to be done, the slit in the spring is turned until it is opposite one of the blocks. Then the spring is spread until its ends are far enough apart to allow the block to come out, as shown in dotted lines in Fig. 3, and then the mandrel is moved longitudinally to project one block D outwardly through the gap in the spring. The spring is then rotated until its gate is opposite the next block, and then this is removed in a similar manner.

Having thus described our invention, what we claim as new, and desire to secure by Letters Patent, is—

1. A boiler-tube tool, comprising a revolving head carrying movable die-blocks and dies, a longitudinally-adjustable mandrel having an inclined surface adapted to project said die-blocks away from the center, a rotary sleeve carrying said die-blocks and extending the full length of the tool, a swivel-frame for supporting the sleeve between its ends, a support for the swivel-frame and means for gaging and fixing the position of the swivel-frame in relation to its support as described.

2. A boiler-tube tool, comprising a revolving head carrying movable die-blocks and dies, a longitudinally-adjustable mandrel having an inclined surface adapted to project said die-blocks away from the center, a rotary sleeve carrying said die-blocks and extending the full length of the tool, a swivel-frame for supporting the sleeve between its ends, a support for the swivel-frame, a cross-bar and bolt for anchoring said support in one of the holes in the boiler-head and means for gaging and fixing the position of the swivel-frame in relation to the support as described.

3. A boiler-tube tool, comprising a revolving head carrying expansible dies, a longitudinally-adjustable mandrel having an inclined surface adapted to project said dies away from the center, a rotary sleeve, a swivel-frame for the sleeve, a support for the swivel-frame, a grooved headed screw bolt tapped in the end of said support and a gage-latch pivoted to the swivel-frame and arranged to lock into the groove of the bolt substantially as described.

4. A boiler-tube tool, comprising a revolving head carrying expansible dies, a longitudinally-adjustable mandrel having an inclined surface adapted to project said dies away from the center, a rotary sleeve, a swivel-frame for the sleeve, a support for the swivel-frame, said support and swivel-frame having a longitudinal adjustment in relation to each other and a bolt rigidly connecting them and means for determining the position of the support and swivel-frame in relation to each other.

5. A boiler-tube tool, comprising a revolving head carrying expansible dies, a longitudinally-adjustable and tapering mandrel, a rotary sleeve having a screw-threaded exterior, a sectional collar interiorly threaded and adjustably fixed upon said sleeve, a swivel-frame having a ring turning on the sectional collar, a support for the swivel-frame, and means for regulating the position of the swivel-frame on its support as described.

6. A boiler-tube tool, comprising a revolving head carrying expansible dies, a longitudinally-adjustable and tapering mandrel, a rotary sleeve having a grooved collar fixed rigidly thereto but longitudinally adjustable thereon, a swivel-frame having a ring forming a bearing for said collar, a support for the swivel-frame, and means for regulating the position of said frame on its support as described.

7. A boiler-tube tool, comprising a revolving head carrying expansible dies, a longitudinally-adjustable and tapering mandrel, a rotary sleeve bearing an adjustable collar, a swivel-frame having two pendent rings, one supporting the sleeve-collar and the other the outer end of the sleeve, a support for the swivel-frame and means for regulating the relation between the said frame and its support as described.

PHILIP W. CHAMBERLAIN.
EDWARD G. CHAMBERLAIN.

Witnesses to the signature of Philip W. Chamberlain:
SOLON C. KEMON,
EDW. W. BYRN.

Witnesses to the signature of Edward G. Chamberlain:
LIONEL C. RICHARDSON,
FRANCISCO THOMAS.